(12) United States Patent
Bader et al.

(10) Patent No.: US 8,855,879 B2
(45) Date of Patent: Oct. 7, 2014

(54) METHOD FOR OPERATING A CLUTCH

(75) Inventors: Martin-Joachim Bader, Mochenwangen (DE); Karl Locher, Pfronstetten-Tigerfeld (DE); Robert Gronner, Horgenzell (DE); Olaf Moseler, Werneck (DE); Markus Terwart, Thundorf (DE); Michael Vollmann, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 93 days.

(21) Appl. No.: 13/515,517

(22) PCT Filed: Nov. 24, 2010

(86) PCT No.: PCT/EP2010/068076
§ 371 (c)(1),
(2), (4) Date: Jun. 13, 2012

(87) PCT Pub. No.: WO2011/076508
PCT Pub. Date: Jun. 30, 2011

(65) Prior Publication Data
US 2012/0295760 A1 Nov. 22, 2012

(30) Foreign Application Priority Data
Dec. 21, 2009 (DE) .......................... 10 2009 055 063

(51) Int. Cl.
*F16D 25/12* (2006.01)
*G06F 17/00* (2006.01)
*F16D 48/06* (2006.01)

(52) U.S. Cl.
CPC .... *F16D 48/066* (2013.01); *F16D 2500/70406* (2013.01); *F16D 2500/3024* (2013.01); *F16D 2500/1026* (2013.01); *F16D 2500/70414* (2013.01)
USPC ............................................ 701/67; 477/167

(58) Field of Classification Search
CPC ................ F16D 2500/1026; F16D 2500/3024; F16D 2500/70406; F16D 48/066
USPC ............................................. 701/67; 477/167
See application file for complete search history.

(56) References Cited

U.S. PATENT DOCUMENTS 6,101,438 A    8/2000  Staiger et al.
6,292,732 B1 * 9/2001  Steinmetz et al. .............. 701/67
(Continued)

FOREIGN PATENT DOCUMENTS

DE   195 46 292 A1   6/1997
DE   100 34 960 A1   2/2002
DE   100 42 147 A1   3/2002
(Continued)

*Primary Examiner* — Fadey Jabr
*Assistant Examiner* — Yazan A Soofi
(74) *Attorney, Agent, or Firm* — Davis & Bujold, PLLC; Michael J. Bujold

(57) ABSTRACT

A method of operating a clutch serving as a shift element and/or starting clutch of a drive train. During engagement, the clutch will be filled by a fast filling up to a defined minimum pressure. The fast filling is at least subdivided into two phases comprising a basic filling phase and an extension and/or a cutout phase. At the end of the basic filling phase, the actual clutch pressure is measured, and then, when the actual clutch pressure is equal to or larger than the minimum pressure, the extension and/or cutout phase is activated immediately following the basic filling phase. When the actual clutch pressure is lower than the minimum pressure, activation of the extension and/or the cutout phase is at least delayed by a pressure holding phase and, if necessary, by a pressure surplus phase.

15 Claims, 2 Drawing Sheets

(56) References Cited

U.S. PATENT DOCUMENTS

| | | | |
|---|---|---|---|
| 6,569,060 B2 | 5/2003 | Rosi et al. | |
| 7,147,095 B2 | 12/2006 | Kraxner et al. | |
| 2009/0125201 A1* | 5/2009 | Leibbrandt et al. | 701/67 |
| 2009/0209383 A1* | 8/2009 | Olson et al. | 475/120 |
| 2010/0018833 A1* | 1/2010 | Cao et al. | 192/85 R |
| 2011/0112737 A1* | 5/2011 | Neelakantan et al. | 701/67 |
| 2012/0067690 A1* | 3/2012 | Postic et al. | 192/85.63 |

FOREIGN PATENT DOCUMENTS

| | | |
|---|---|---|
| DE | 101 34 294 A1 | 2/2003 |
| DE | 102 23 780 C1 | 10/2003 |
| DE | 102 27 361 A1 | 1/2004 |
| DE | 10 2005 042 933 A1 | 3/2007 |

* cited by examiner

METHOD FOR OPERATING A CLUTCH

This application is a National Stage completion of PCT/EP2010/068076 filed Nov. 24, 2010, which claims priority from German patent application serial no. 10 2009 055 063.1 filed Dec. 21, 2009.

FIELD OF THE INVENTION

The invention concerns a method for operating a clutch.

BACKGROUND OF THE INVENTION

The main components of a drive train of a motor vehicle are the drive aggregate and a transmission, whereby the transmission of the drive train is positioned between the drive aggregate and an output. The transmission converts rotational speeds and torques and provides therefore the traction force available at the output of the drive train. A transmission comprises shift elements, whereby during the execution of a shift or change of gear, respectively, at least one shift element is closed or rather engaged and at least one shift element is opened or rather disengaged. The shift elements of the transmission are preferably designed as clutches.

At least a starting clutch is positioned between the shift elements of the transmission and the drive aggregate. Known through the DE 102 23 780 C1 is a transmission with a hydraulically operated multi-clutch, meaning a hydraulically operated double clutch, in which, between the shift elements of the transmission and the drive aggregate, several clutches are positioned which serve as a starting clutch and/or shift elements.

To engage a hydraulically operated clutch which serves as a shift element and/or a starting clutch, the clutch is hydraulically filled. It is already known through DE 100 42 147 A1 that the filling of a clutch is divided into a fast filling or rather a fast fill phase as well as into a filling compensation or rather filling compensation phase, whereby filling parameters are adopted during the fast filling and during the filling compensation. An additional method for the adoption of the filling of shift elements of a transmission is known from DE 101 34 294 A1.

SUMMARY OF THE INVENTION

Based on the above, the object of the present invention is to create a novel method for the operating of a clutch.

In accordance with the invention, the fast filling is divided into at least two phases, which are a basic filling phase and an extension and/or cutout phase, whereby at the end of the basic filling phase the actual clutch pressure is measured and then, when the actual clutch pressure is larger than or equal to a minimum pressure, the extension and/or cutout phase is immediately activated after the basic filling phase, but at that time when the actual clutch pressure is lower than the minimum pressure, activation of the extension and/or cutout phase is at least delayed by a pressure holding phase, or if appropriate, by a pressure surplus phase.

This inventive method proposes for the first time to subdivide fast filling or rather the fast filling phase of a clutch filling process into at least two partial phases, namely in to a basic filling phase and an extension and/or cutout phase. At the end of the basic filling phase of the fast filling, the actual clutch pressure is measured and compared to a minimum pressure. At the time, when the actual clutch pressure is greater than or equal to the minimum pressure, the extension and/or cut out phase of the fast filling is activated immediately after the basic filling phase of the fast filling. However, if the actual clutch pressure is lower than the minimum pressure, a fast filling extension is executed, by which the activation of the extension and/or cutout phase of the fast filling is at least delayed by a pressure holding phase of the fast filling and, if necessary, is delayed by a pressure surplus phase of the fast filling.

It is hereby possible to provide a defined minimum pressure for the clutch which has to be engaged upon the termination of the fast filling. In particular, the reproducibility of fast filling is improved which increases a shift quality as well as a drive comfort.

BRIEF DESCRIPTION OF THE DRAWINGS

Further preferred embodiments of the invention are based on the following description. The embodiments of the invention are, without being limited thereto, further explained based on the drawings. These show.

DETAILED DESCRIPTION OF THE PREFERRED EMBODIMENTS

The present invention concerns a method for operating a clutch which serves as a shift element and/or as a starting clutch. This clutch which needs to be filled can be, in accordance with the inventive method, a multiple clutch transmission, in particular a double clutch transmission.

The present invention relates to the specifics of operating a clutch which serve for fast filling of the clutch to a minimal pressure, to provide, upon the termination of the fast filling in the clutch, a defined minimum pressure.

It is proposed, in accordance with the invention, that the fast filling or rather fast filling phase of a clutch is at least subdivided into two partial phases, namely into a basic filling phase and an extension and/or cutout phase.

During the basic filling phase, the clutch is filled by means of a defined filling pulse which is characterized by a defined pulse duration and pulse height. At the end of the basic filling phase, the actual clutch pressure, which is created in the clutch, is measured and compared with the minimum pressure. At the time when the actual clutch pressure is equal to or higher than the minimum pressure, the extension and/or coupled phase of the fast filling is activated immediately after the basic filling phase. However, when the actual clutch pressure, which is created in the clutch during the basic filling phase, is lower than the minimum pressure, the activation of the extension and/or cutout phase is delayed, namely by a pressure holding phase and, if necessary, by a pressure surplus phase which prolongs the fast filling of the clutch. Hereby, the pressure surplus phase is only activated when the pressure holding phase was previously executed.

The inventive method for operating of a clutch during the fast filling of the clutch provides monitoring of the clutch pressure which is created through the fast filling, and provides monitoring of the filling level of the clutch, whereby at the time when, during the basic filling phase of the fast filling, a minimum pressure in the clutch is not achieved, a fast filling extension is executed such that the extension and/or cutout phase of the fast filling is at least delayed by a pressure holding phase of the fast filling and, if necessary, by a pressure surplus phase of the fast filling. The fast filling extension, and thus activation of the pressure holding phase and, if necessary, the pressure surplus phase before activation of the extension and/or cutout phase is therefore dependent on pressure criterion.

Figure 1:
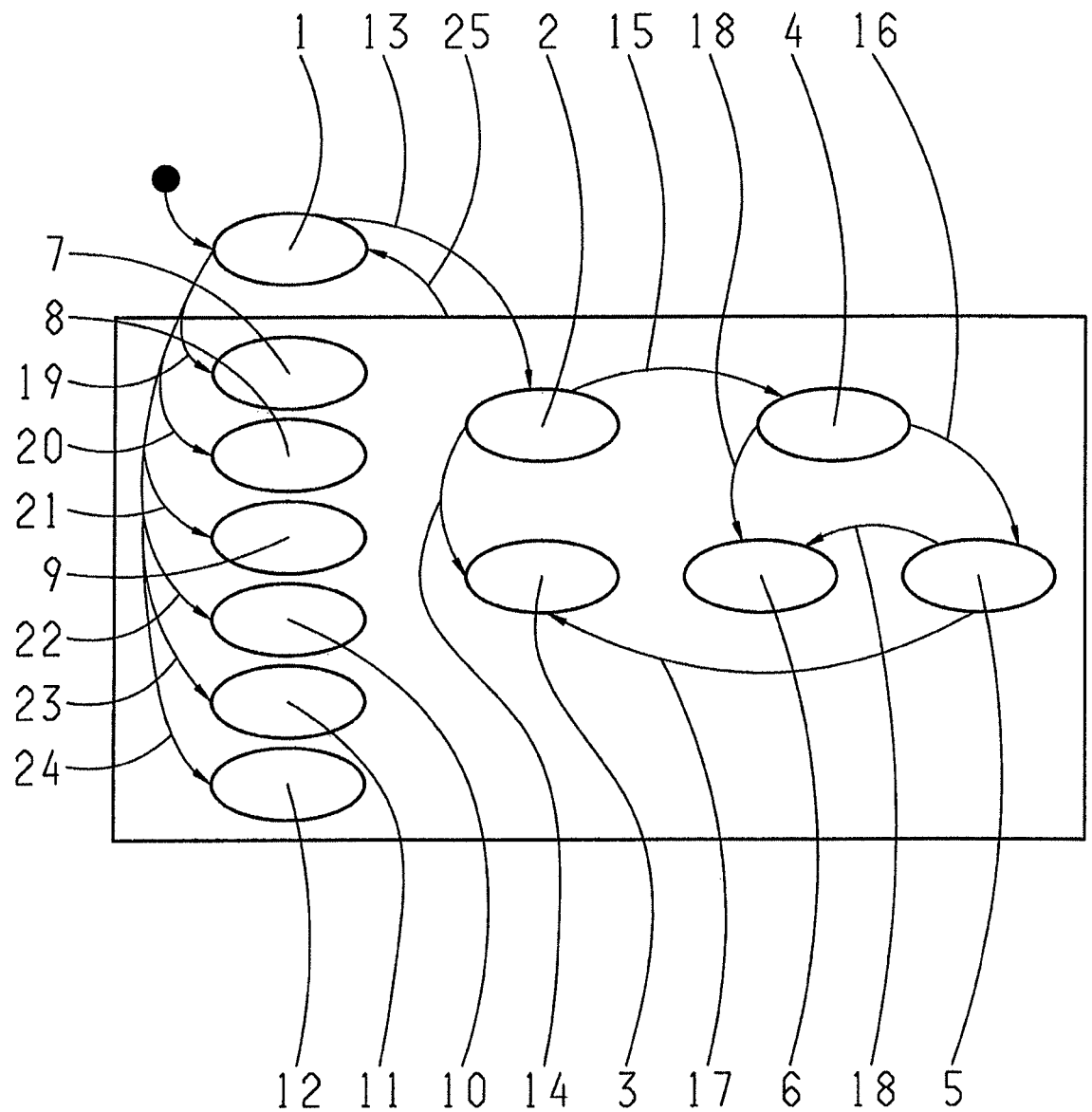
FIG. 1 a condition diagram for the clarification of the inventive method for operating a clutch.

Hereafter, the details of the inventive method are explained based on the condition diagram in FIG. 1.

The FIG. 1 shows a condition diagram with several conditions 1, 2, 3, 4, 5, 6, 7, 8, 9, 10, 11, and 12, whereby the transition between each of the conditions 1 to 12 are defined by the transition conditions 13, 14, 15, 16, 17, 18, 19, 20, 21, 22, 23, 24, and 25. The conditions 2 to 6 can be directly assigned to the inventive method and relate to the inventive fast filling, if necessary, with fast filling extension. The conditions 1 and 7 to 12 relate to the conditions in which the inventive fast filling, if necessary, is not executed with a fast filling extension.

The condition 1 of the condition diagram relates to a condition in which a clutch filling is inactive. At the time when the transition condition 13 is met, and also when none of the transition conditions 19 to 24 are met, a transition from condition 1 to condition 2 takes place.

The condition 2 relates to the basic filling phase of the fast filling in which the clutch needing to be filled is fast filled by means of a defined filling pulse which is characterized by a defined pulse length and a defined pulse height. During the condition 2, a measurement of the actual developing clutch pressure during the basic filling phase is also taking place and a comparison of it to a minimum pressure.

At the time, when it is noticed in condition 2 that the developing clutch pressure during the basic filling phase is equal to or larger than a minimum pressure, the transition criterion 14 is met and a transition from condition 2 to condition 3 takes place, whereby in condition 3, immediately after the basic filling phase of the fast filling, an extension and/or cutout phase of the fast filling is activated.

Thus and in accordance with the invention, fast filling is divided into at least two phases, namely into the basic filling phase of the condition 2 and into the extension and/or cutout phase of the condition 3, the immediate transition from the basic filling phase to the extension and/or cutout phase takes place at the time when, in accordance with the transition criterion 14, a pressure criterion is met in the basic filling phase, meaning that the actual developing clutch pressure during the basic filling phase is equal to or higher than the minimum pressure.

However, if it is noticed, at the end of the basic filling phase in condition 2, that the actual clutch pressure is lower than the minimum pressure, such that the transition criterion 14 is not met, but instead the transition criterion 15 and a transition from the condition 2 into the condition 4 takes place.

The condition 4 relates to a pressure of holding phase which is also called a hold pressure phase, wherein, during the pressure holding phase, a filling pulse for the fast filling of the clutch is maintained until the actual clutch pressure is equal to the minimum pressure. Hereby, it is monitored in condition 4, by means of a timer, that the permissible delay time duration for the fast filling is not exceeded. If it is noticed in condition 4 that the permissible delay time duration is exceeded by the pressure holding phase of the condition 4, the transition criterion 18 is met and a transition from condition 4 into condition 6 takes place, whereby the fast filling of the clutch is interrupted in the condition 6. However, if it is noticed in condition 4 that during the pressure holding phase in condition 4 a minimum pressure has been reached without exceeding the permissible delay time duration, the transition criterion 16 is met and a transition from condition 4 into a condition 5 takes place, wherein the condition 5 relates to the pressure surplus phase. The pressure surplus phase can also be called Over Shoot Phase.

In the pressure surplus phase of the condition 5, a filling pulse is activated for a defined pressure surplus time duration to fill the clutch above the minimum pressure by a defined amount, whereby it is monitored in this condition 5 that the permissible delay time duration is not exceeded. Hereby, only the remainder of the permissible delay time duration is available for the pressure surplus phase which has not been used during the pressure holding phase of the condition 4, to achieve the minimum pressure. If it is noticed in the condition 5 that the pressure surplus time duration has exceeded the permissible delay time, then the transition criterion 18 is met and a transition from condition 5 to the condition 6 takes place, such that in condition 6 the fast filling is terminated. However, if it is noticed in the condition 5 that the needed time duration for the pressure holding phase and the pressure surplus phase does not exceed the permissible delay time duration of the fast filling delay, then the transition criterion 17 is met and a transition from condition 5 to condition 3 takes place, whereby the condition 3, with the pressure surplus phase of the condition 5, is followed by the extension and/or cutout phase.

As a pressure criterion, through which it is checked whether the transition criterion 14 and 15 is met, a minimum pressure is used which is dependent on the engaging pressure of the clutch which has to be filled, a centrifugal force compensation pressure, as well as, if necessary, an applicable offset pressure.

The pressure surplus time duration of the pressure surplus phase under the condition 5, for which, after the termination of the pressure holding phase of the condition 4, a filling pulse is activated in condition 5, is preferably calculated dependent on a transmission oil temperature and/or dependent of a dead-time of the fast filling, and/or dependent of a shift procedure based on a request by the driver. The dead-time of the fast filling is meant to be the time interval between the filling request and the start of the actual filling of the clutch.

As already mentioned, the execution of the inventive method, meaning the fast filling of a clutch, including the monitoring of the clutch pressure and the respective, depending fast filling extension, takes place only if, on one hand, the transition criterion 13 is met and if, on the other hand, none of the transition criteria 19 to 24 are met. If the transition criterion 14 and also one of the transition criteria 19 to 24 are met, a fast filling of the clutch takes place, however, during the conditions 7 to 12, but without monitoring of the actually developing clutch pressure and the dependent fast filling extension. Instead, a conventional fast filling then takes place under the conditions 7 to 12.

In an advantageous, further embodiment of the invention the inventive method is only executed when the permissible way of filling the clutch is present. It can be provided that the inventive fast filling is only executed during an idling filling and/or comfort filling of a clutch. In principle, if a clutch filling is requested but it is recognized that this way of filling is, for instance, not an idling filling or comfort filling, the transition criteria 13 and 19 are simultaneously met, whereby here the transition does not take place from condition 1 to condition 2, but instead a transition to the condition 7 takes place, whereby here in the condition 7 the conventional fast filling of the clutch takes place.

In addition, the inventive method for fast filling a clutch shall only be executed when an adaptation of the clutch filling is inactive. If it is recognized, however, that an adaptation of the clutch filling is activated, then the transition condition 20 is met and condition 8 is chosen, such that conventional fast filling of the clutch takes place under condition 8.

If it is noticed during the activation of a clutch filling that a pressure sensor, which serves for monitoring the clutch pressure, is ineffective and therefore cannot provide exact measurement signals, then the transition criterion 21 is met and condition 9 is chosen, whereby in the condition 9, conventional fast filling of the clutch is again executed, but not the inventive fast filling, including the clutch pressure monitoring and possibly the fast filling extension.

It can also be provided to only allow the transition from condition 1 to condition 2 at an activated clutch filling when operating parameters of the transmission and/or the engine are within permissible value ranges. If it is for instance recognized that an engine rotational speed of the drive train is outside of a defined value range, then the transition criterion 22 is met, and the transition from condition 1 to condition 2 is not permitted, but instead a transition takes place from condition 1 to condition 10 in which clutch filling by way of conventional fast filling is again executed.

It is also possible to monitor whether an engine oil temperature and/or a transmission oil temperature is or rather are within the permissible value ranges. If the engine oil temperature is outside of the permissible value range, then the transition criterion 23 is met. If the transmission oil temperature is outside of a permissible value range, then the transition criterion 24 is met. In both cases, a transition from condition 1 to condition 2 is not permitted, but instead from condition 1 to condition 11 or rather 12 in which began a clutch filling by executing a conventional fast filling, meaning without a clutch pressure monitoring and possibly a fast filling extension.

At the time when a clutch filling is deactivated, the transition condition 25 has taken place, so that the clutch filling is terminated and, starting at each of the conditions 2 to 12, a return to condition 1 takes place.

The inventive method for the fast filling of a clutch with clutch pressure monitoring and its dependent fast filling extension is preferably applied when an engine or drive aggregate, respectively, beginning at an engine stop of a start-stop automatic, is again started.

For such an engine restart from the engine stop in the so-called start-stop operation, the subdivision of the fast filling takes place in the basic filling phase and the extension and/or cutout phase, wherein, depending on the developing clutch pressure during the basic filling phase, a fast filling extension can be achieved through activation of a pressure holding phase and, if necessary, a pressure surplus phase, as it was described in detail by referencing the condition diagram of the FIG. 1.

At the time when the inventive method for the fast filling extension is applied, depending of the developing clutch pressure during the basic filling phase, during the engine restart from the engine stop of a start-stop automatic, it is desirable for reasons of high drive comfort that a drive aggregate of a drive train in which the clutch, which needs to be filled, is installed, creates a torque only when an activated pressure holding phase and, if necessary, a pressure surplus phase which is dependent of the clutch pressure, is terminated. For reasons of comfort, it is desirable that the creation of torque for the drive aggregate is only started at the time when the fast filling is in the extension and/or cutout phase.

Hereby and in an advantageous further embodiment of the invention, an estimate of the developing fast filling extension in this inventive method is performed to guarantee that a torque is created for the drive aggregate only with the termination of a possibly initiated fast filling extension which depends of the clutch pressure.

Figure 2:
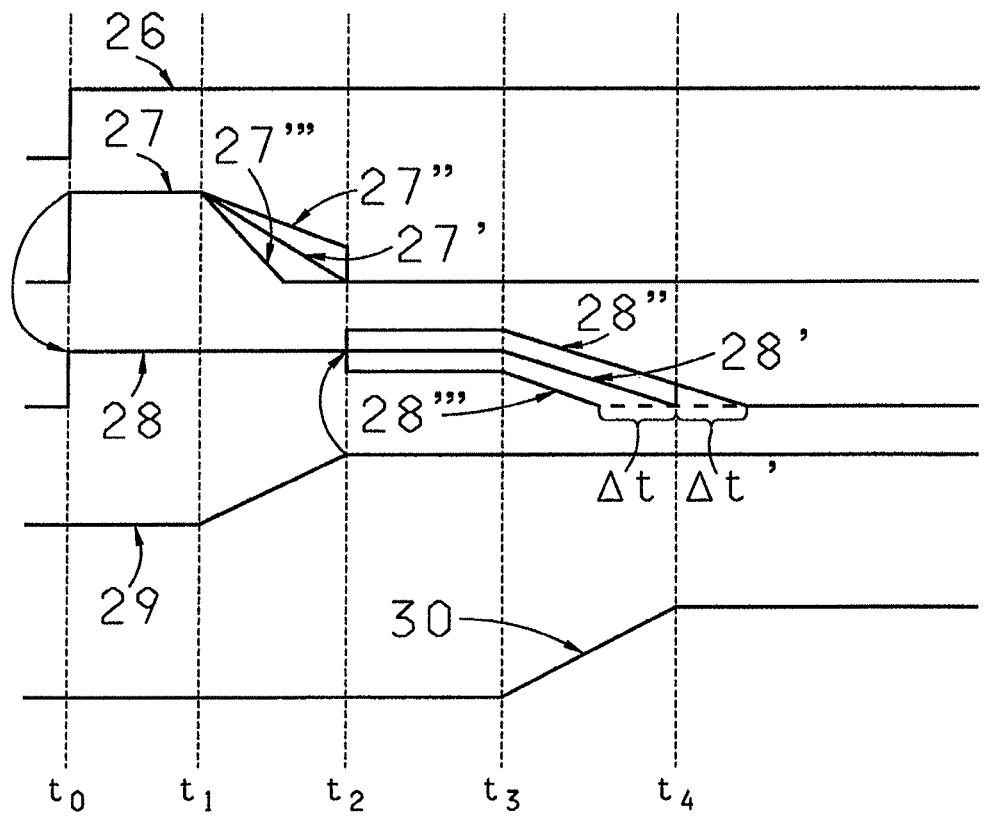
FIG. 2 a time diagram for the clarification of an application of the inventive method during an engine restart, beginning from the motor at stop of an automatic start-stop automatic.

The respective details are presented in the diagram of FIG. 2, where in the diagram of FIG. 2 a total of five time curves are plotted over time t, meaning a curve form 26 which shows a demand for a filling request, a curve form 27, which shows an estimated dead-time of the fast filling, a curve form 28 which shows an estimated fast filling extension, a curve form 29 which shows the actual dead-time of the fast filling, and a curve form 30 which visualizes the actually created fast filling extension.

At the time $t_0$, in accordance with the curve form 26, a filling of a clutch is requested. Immediately with the request for the filling of the clutch, in accordance with the curve form 26 and therefore immediately with the request for the filling of the clutch, a dead-time for the fast filling is estimated in accordance with the curve form 27. At the time $t_0$, in accordance with the curve form 28 and also dependent of the estimated dead-time, a fast filling extension is estimated which is created by the pressure holding phase and, if necessary, by the pressure surplus phase of the inventive method. The estimation of the dead-time, in accordance with the curve form 27, is performed dependent of the stop time of the engine in the start-stop operation, as well as preferably dependent on a transmission oil temperature from a stored parameter set. The estimation of the fast filling extension at the time $t_0$, in accordance with the curve form 28 preferably also takes place dependent on the transmission oil temperature from set engine characteristics as well as, if necessary, dependent of other influencing factors.

At the time $t_1$, in accordance with the curve form 29, the actual dead-time starts and is terminated at the time $t_2$, whereby the curve form 27' of the curve form 27 illustrates a situation in which the estimated dead-time is equal to the actual dead-time. The curve form 27'' of the curve form 27 relates to a dead-time which is estimated as being too long, the curve form 27''' is a dead-time which is estimated as being too short.

After the termination of the dead-time at the time $t_2$, a new estimation takes place of the fast filling extension, which is created by the pressure holding phase and, if necessary, by the pressure surplus phase, at the time $t_2$, but here based on the actually calculated dead-time.

Between the times $t_2$ and $t_3$, a basic filling phase of the invented fast filling works in ascertaining the actually developing clutch pressure, wherein the basic filling phase is terminated at the time $t_3$ and the fast filling extension is activated in the embodiment example in FIG. 2, namely by activating the pressure holding phase and if necessary, the pressure surplus phase which follows the pressure holding phase. At the time $t_4$, the fast filling extension, meaning the pressure holding phase for the pressure surplus phase is terminated, wherein it is then calculated at the time $t_4$ how the actual fast filling extension of the curve form 30 relates to the estimated fast filling extension of the curve form 28. The curve form 28' of the curve form 28 corresponds to a situation in which the actual fast filling extension equals the estimated fast filling extension. The curve form 28'', in comparison, explains a situation in which the fast filling extension was estimated as being too long. The curve form 28''' of the curve form 28 illustrates an estimated fast filling extension which was estimated as being too short.

Depending of the difference $\Delta t$ or rather $\Delta t'$ between the actual fast filling extensions and the estimated as filling extensions, modification or rather matching of the clutch filling which follows the fast filling takes place so as to thereby increase the drive comfort. It is for instance possible in that context to modify a time interval and/or a filling pressure of a filling compensation or rather filling compensation phase of the clutch which follows after the inventive fast filling.

REFERENCE CHARACTERS

1 Condition
2 Condition
3 Condition
4 Condition
5 Condition
6 Condition
7 Condition
8 Condition
9 Condition
10 Condition
11 Condition
12 Condition
13 Transition Condition
14 Transition Condition
15 Transition Condition
16 Transition Condition
17 Transition Condition
18 Transition Condition
19 Transition Condition
20 Transition Condition
21 Transition Condition
22 Transition Condition
23 Transition Condition
24 Transition Condition
25 Transition Condition
26 Curve Form
27, 27', 27", 27'" Curve Form
28, 28', 28", 28" Curve Form
29 Curve Form
30 Curve Form

The invention claimed is:

1. A method of operating a clutch of a drive train of a motor vehicle, the method comprising the steps of:
   providing a transmission with at least one hydraulic clutch;
   filling the clutch for engagement, from a hydraulic supply, the clutch being filled up to a defined minimum pressure by a fast filling phase which comprises a basic filling phase and a second phase;
   measuring, via a pressure sensor, an actual clutch pressure at an end of the basic filling phase;
   immediately terminating the basic filling phase from the hydraulic supply when the actual clutch pressure is either equal to or larger than the minimum pressure;
   delaying termination of the basic filling phase by activating at least one of a pressure holding phase and a pressure surplus phase, when the actual clutch pressure is lower than the minimum pressure; and
   filling the clutch, during the basic filling phase, for a defined filling pulse characterized by a defined pulse duration and a defined pulse height, and extending the pulse duration in an event that the clutch pressure is lower than the minimum pressure at the end of the defined pulse duration.

2. The method according to claim 1, further comprising the steps of subdividing the fast filling phase into the basic filling phase, at least one of an extension phase and a cutout phase;
   immediately activating at least one of the extension phase and the cutout phase after the basic filling phase, when the actual clutch pressure is either equal to or larger than the minimum pressure; and
   delaying activation of the at least one of the extension phase and the cutout phase by activating at least one of the pressure holding phase and the pressure surplus phase, when the actual clutch pressure is lower than the minimum pressure.

3. The method according to claim 1, further comprising the steps of maintaining a filling pulse, during the pressure holding phase, until the actual clutch pressure is equal to the minimum pressure;
   monitoring, with a timer, that a permissible delay time duration is not exceeded;
   terminating the filling of the clutch when the delay time duration is exceeded; and
   activating the pressure surplus phase right after the pressure holding phase, when the delay time duration is not exceeded.

4. The method according to claim 3, further comprising the steps of activating the filling pulse, during the pressure surplus phase, for a defined pressure surplus time duration;
   monitoring, with the timer, that the permissible delay time duration is not exceeded; and
   terminating the filling of the clutch, when the delay time duration is exceeded.

5. The method according to claim 1, further comprising the step of calculating a time duration of the defined pressure surplus with respect to at least one of a transmission oil temperature, a dead-time of the fast filling phase and a shift manner which is requested by a driver.

6. The method according to claim 1, further comprising the step of defining the minimum pressure as an engagement pressure of the clutch plus a centrifugal force compensation pressure plus a freely applicable offset pressure.

7. The method according to claim 1, further comprising the step of exclusively executing the method at a time when either an adaptation of the clutch filling is not active or when the pressure measurement signal from the pressure sensor is not faulty.

8. The method according to claim 1, further comprising the step of exclusively executing the method when an engine rotational speed of the drive train is within permissible value ranges.

9. The method according to claim 1, further comprising the step of exclusively executing the method when at least one of a motor oil temperature and a transmission oil temperature of the drive train is within permissible value ranges.

10. The method according to claim 1, further comprising the step of exclusively executing the method when a permissible filling mode for the clutch is present.

11. The method according to claim 1, further comprising the step of executing the method during an engine restart, beginning at a motor stop of a start-stop automatic.

12. A method of operating a clutch of a drive train of a motor vehicle, the method comprising the steps of:
   filling the clutch for engagement, the clutch being filled up to a defined minimum pressure by a fast filling process which comprises a basic filling phase;
   measuring an actual clutch pressure at an end of the basic filling phase;
   immediately terminating the basic filling phase, when the actual clutch pressure is either equal to or larger than the minimum pressure;
   delaying termination of the basic filling phase, by activating at least one of a pressure holding phase and a pressure surplus phase, when the actual clutch pressure is lower than the minimum pressure;

initially and immediately estimating a dead-time for the fast filling process upon a filling request for the clutch and beginning at an engine stop;

estimating a fast filling extension depending on an estimated dead-time which is initiated by the pressure holding phase and the pressure surplus phase;

re-estimating the fast filling extension, initiated by the pressure holding phase and by the pressure surplus phase after running the actual dead-time; and upon termination of the actual fast filling extension, calculating a deviation between the estimated fast filling extension and the actual fast filling extension.

13. The method according to claim 12, further comprising the step of modifying a subsequent fast filling process of the clutch depending on the deviation between the estimated fast filling extension and the actual fast filling extension.

14. The method according to claim 1, further comprising the step of determining if the clutch pressure is less than the minimum pressure before terminating the basic filling phase.

15. The method according to claim 1, further comprising the steps of initiating, after the fast filling phase is complete, a filling compensation phase.

\* \* \* \* \*